United States Patent
Fröberg Olsson et al.

(10) Patent No.: US 10,419,098 B2
(45) Date of Patent: Sep. 17, 2019

(54) METHODS AND APPARATUS FOR PRECODING CONTROL IN A WIRELESS COMMUNICATION NETWORK

(71) Applicant: Telefonaktiebolaget LM Ericsson (publ), Stockholm (SE)

(72) Inventors: Jonas Fröberg Olsson, Ljungsbro (SE); Mirsad Cirkic, Linköping (SE); Martin Hessler, Linköping (SE); Kristina Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/545,340

(22) PCT Filed: Apr. 7, 2017

(86) PCT No.: PCT/SE2017/050347
§ 371 (c)(1),
(2) Date: Jul. 21, 2017

(87) PCT Pub. No.: WO2018/186778
PCT Pub. Date: Oct. 11, 2018

(65) Prior Publication Data
US 2018/0302142 A1  Oct. 18, 2018

(51) Int. Cl.
*H04B 7/06* (2006.01)
*H04B 7/0456* (2017.01)

(52) U.S. Cl.
CPC ......... *H04B 7/0639* (2013.01); *H04B 7/0456* (2013.01); *H04B 7/0617* (2013.01); *H04B 7/0626* (2013.01); *H04B 7/0658* (2013.01)

(58) Field of Classification Search
CPC .. H04B 7/0456; H04B 7/0478; H04B 7/0482; H04B 7/0486; H04B 7/0639; H04B 7/0617; H04B 7/0626; H04B 7/0658
See application file for complete search history.

(56) References Cited

U.S. PATENT DOCUMENTS

| 2011/0249637 A1 | 10/2011 | Hammarwall et al. |
| 2012/0020433 A1 | 1/2012 | Bhattad et al. |

(Continued)

FOREIGN PATENT DOCUMENTS

| WO | 2015135596 A1 | 9/2015 | |
| WO | WO 2016032104 A1 * | 3/2016 | ........... H04B 7/0617 |

(Continued)

*Primary Examiner* — Aristocratis Fotakis
(74) *Attorney, Agent, or Firm* — Murphy, Bilak & Homiller, PLLC

(57) ABSTRACT

Culling a set of precoders down to a smaller set using a comparatively simple first-pass evaluation allows a wireless device or other entity to reduce an overall computational burden associated with identifying a currently preferred precoder. An example approach involves selecting a reduced set of precoders from a full set of precoders, based on performing preliminary evaluations of precoders in the full set, and selecting a preferred precoder or precoders from the reduced set, based on performing further evaluations of precoders in the second set. On a per precoder basis, the further evaluations are more complex than the preliminary evaluations. One may view the approach as using less complex first-pass evaluations to reduce the precoder search space, and then using more complex second-pass evaluations to identify a currently preferred precoder or precoders within the reduced search space.

20 Claims, 3 Drawing Sheets

(56) References Cited

U.S. PATENT DOCUMENTS

| | | | |
|---|---|---|---|
| 2013/0016764 A1* | 1/2013 | Kim | H04L 25/03343 375/219 |
| 2013/0272250 A1* | 10/2013 | Shimezawa | H04B 7/063 370/329 |
| 2014/0064393 A1* | 3/2014 | Sun | H04B 7/0478 375/267 |
| 2015/0009836 A1* | 1/2015 | Tujkovic | H04L 1/0026 370/252 |
| 2015/0207552 A1 | 7/2015 | Nammi et al. | |
| 2015/0215023 A1* | 7/2015 | Thurfjell | H04B 7/046 375/295 |
| 2015/0358062 A1* | 12/2015 | Skillermark | H04L 1/0026 370/329 |
| 2016/0094284 A1 | 3/2016 | Yum et al. | |
| 2016/0127018 A1 | 5/2016 | Nammi et al. | |
| 2016/0301455 A1 | 10/2016 | Nammi et al. | |
| 2017/0222699 A1* | 8/2017 | Scherb | H04B 7/0456 |
| 2017/0272223 A1* | 9/2017 | Kim | H04B 7/0617 |
| 2019/0109679 A1* | 4/2019 | Liu | H04L 5/005 |

FOREIGN PATENT DOCUMENTS

| | | |
|---|---|---|
| WO | 2016114708 A2 | 7/2016 |
| WO | 2017138852 A1 | 8/2017 |

* cited by examiner

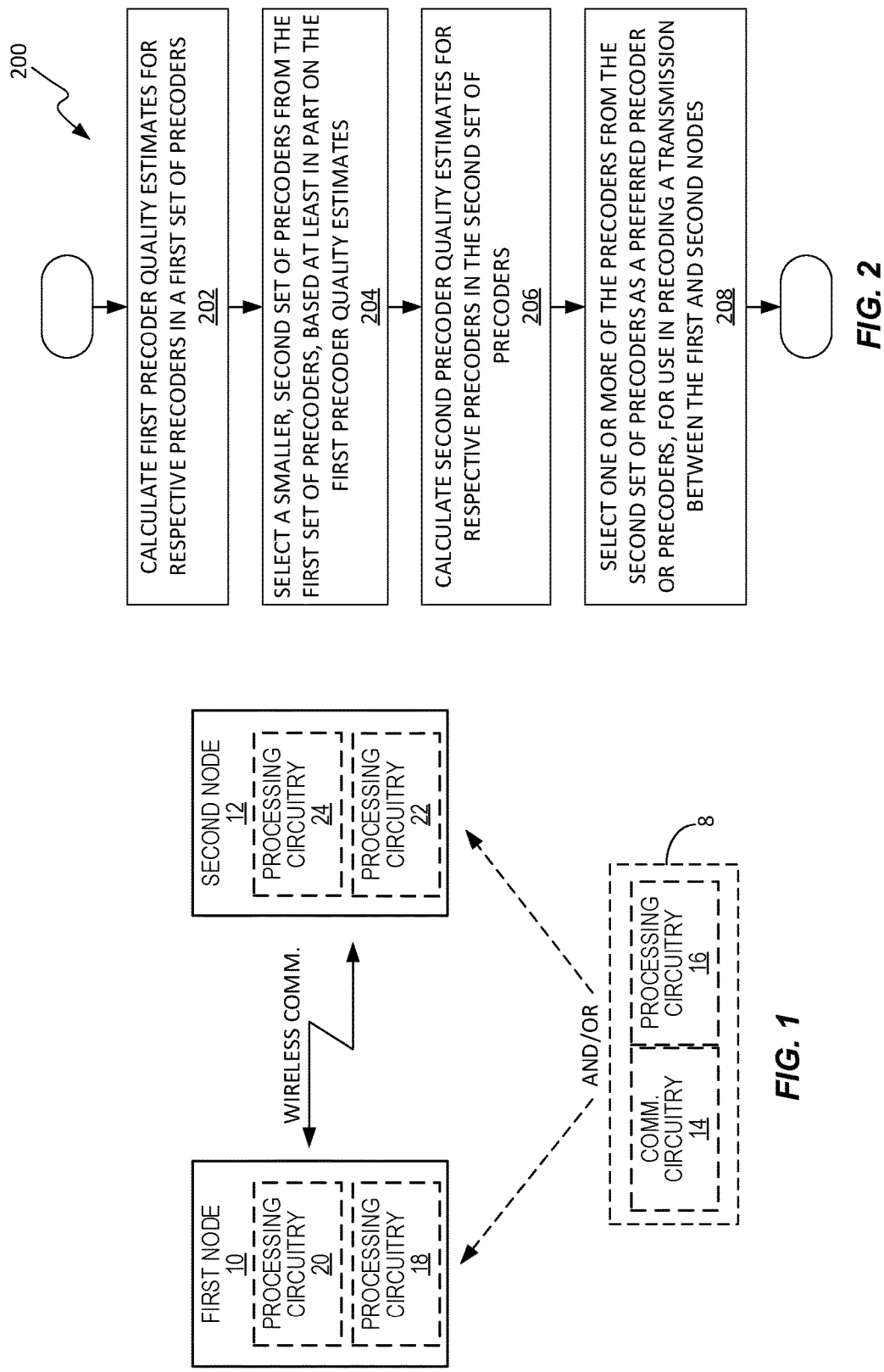

METHODS AND APPARATUS FOR PRECODING CONTROL IN A WIRELESS COMMUNICATION NETWORK

TECHNICAL FIELD

The present invention relates to wireless communication networks, and particularly relates to precoding control in a wireless communication network.

BACKGROUND

In many wireless communications systems, Channel-State Information, CSI, feedback is crucial for obtaining good performance between a transmitting entity and a receiving entity. For example, the transmitting entity transmits references signals that provide the receiving entity with a basis for estimating channel state. Reported CSI feedback from the receiving entity typically includes a Channel-Quality Indicator, CQI, a Rank Indicator, RI, and a Precoding Matrix Indicator, PMI. The CQI value servers as a quantized representation of measured signal quality, the RI value indicates the number of transmission layers that can be supported, and the PMI value indicates a preferred precoder—i.e., a preferred set of antenna weights to be used for performing a multi-antenna transmission from or to the reporting entity. In general, the entity reporting CSI and the entity receiving the CSI report have knowledge of a defined codebook that contains some number of precoders, wherein the PMI "points" to a preferred one of the precoders within the codebook.

The Third Generation Partnership Project, 3GPP, Long Term Evolution, LTE, system supports CSI-reporting schemes that rely on the reference symbols being transmitted periodically. The LTE radio structure is based on recurring frames of a defined duration, with each frame subdivided into a regular number of subframes. In this context, cell-specific reference symbols, CRS, are sent every subframe, for example, while user-specific CSI Reference Symbols, CSI-RS, may be sent with a larger periodicity. User Equipments, UEs, using Transmission Mode 10, TM10, rely solely on CSI-RS resources, while other UEs typically use the CRS at least for interference measurements.

UEs operating in an LTE system transmit CSI reports either on the Physical Uplink Control Channel, PUCCH, or the Physical Uplink Shared Channel, PUSCH. CSI reporting on the PUSCH generally involves the transmission of CSI along with whatever data is being transmitted on the PUSCH. TM10 UEs can be configured to report CSI for multiple CSI-processes, which each may have different CSI-measurement resources. A CSI-measurement resource, CSI-MR, consists of a CSI-RS resource and a CSI Interference Measurement, CSI-IM, resource. Both the CSI-RS and the CSI-IM resources are divided into sets of resources, where each set is identified by CSI-RS configuration index. Each CSI-RS configuration index contains resources in every Physical Resource Block, PRB, in the involved frequency band. A subframe configuration specifies a subframe periodicity and a subframe offset that specify for the UE at which time instances the respective measurement resources are available.

As the number of antenna elements used at access nodes in the radio network increases, the size of the precoder codebooks used for precoding from these larger sets of antenna elements also increases. In the early releases of LTE, the number of different precoders was rather limited. For example, for two antenna ports, four rank-1 and two rank-2 precoders were specified. For four antenna ports, sixteen different precoders were specified. The number of bits in the CSI report to indicate the desired precoder was limited to two and four bits for two and four antenna ports, respectively. However, Release 11, R-11, of the 3GPP specifications extended precoder support up to eight antenna ports, resulting in a significant expansion in the size of the precoder codebook. For example, for rank one and two, eight bits is required to indicate the desired precoder. Release 13, R-13, extended precoding support for up to sixteen antenna ports and providing for up to eight transmission layers, i.e., Rank 8 transmissions, with over-sampling of the precoder codebook. These changes again increased the number of bits needed to indicate a desired precoder from the precoder codebook. For example, using sixteen antenna ports and with configuration parameters ($N_1$, $N_2$) . . . , nine bits is required to indicate a desired precoder from the defined codebook, if the rank is at most two.

As the number of antenna ports increases, the number of feedback bits required in the CSI report increases. While the increased overhead may not be significant when reporting CSI over PUSCH, PUCCH is a scarce resource shared among all UEs in a cell, and significantly increasing CSI reporting overhead on the PUCCH is problematic.

For the Fifth Generation, 5G, systems now under development—e.g., systems using the "New Radio" or NR interface now being standardized—the number of transmit antennas on the network side are expected to increase dramatically, as compared to current systems. For example, a radio access node may be equipped with several hundred antennas (or antenna elements), allowing sophisticated beamforming. It is recognized herein that existing approaches to precoding control, including existing approaches to evaluating and reporting preferred precoders, do not scale well as the number of antenna ports increases.

As one example, consider that a UE or other wireless devices needs to allocate significant computational resources when evaluating large codebooks to identify preferred precoders. It may be difficult, for example, for a wireless device to evaluate large sets of precoders within the time constraints associated with ongoing communications. Even allowing for continued improvements in the processing capabilities of wireless devices, however, the power expended on large sets of computations will negatively affect battery life of such devices.

To see the complexity associated with evaluating a set of precoders, consider the well-known Maximum Mean Square Error, MMSE, receiver, wherein a precoder P, from a set of precoders S, is determined such that the Signal-to-Noise-and-Interference-Ratio, SINR, representing a quality estimate q(P) is maximized. Hence, the problem becomes $$P = \arg\max_{P \in S} q(P).$$

To determine the SINR for layer l for a channel matrix H and interference and noise covariance matrix Q when using the precoder P, the following computations may be carried out at the wireless device:

$$R = (HPP^*H^* + Q)$$

$$W = P^*H^*R^{-1}$$

-continued $$Q_x = I - WHP + WQW^*$$

$$SINR_l(P) = \frac{([WHP]_{l,l})^2}{[Q_x]_{l,l}}$$

$$q(P) = \sum_l SINR_l(P)$$

The preceding computations involve complex matrix multiplications and inverses and some computations involve P and require that q(P) is evaluated per P, i.e., per precoder being evaluated. This fact means that when evaluating which precoder is preferred, a large number of overall computations is required when the overall set of precoders is large, i.e., when the codebook is large.

SUMMARY

Culling a set of precoders down to a smaller set using a comparatively simple first-pass evaluation allows a wireless device or other entity to reduce an overall computational burden associated with identifying a currently preferred precoder. An example approach involves selecting a reduced set of precoders from a full set of precoders, based on performing preliminary evaluations of precoders in the full set, and selecting a preferred precoder or precoders from the reduced set, based on performing further evaluations of precoders in the second set. On a per precoder basis, the further evaluations are more complex than the preliminary evaluations. One may view the approach as using less complex first-pass evaluations to reduce the precoder search space, and then using more complex second-pass evaluations to identify a currently preferred precoder or precoders within the reduced search space.

An example method is performed by at least one node, e.g., at least one of a first node and a second node that are configured for wirelessly communicating with each other. The method includes calculating, according to a first calculation, first precoder quality estimates for respective precoders in a first set of precoders, and selecting a smaller, second set of precoders from the first set of precoders, at least in part as a function of the first precoder quality estimates. The method further includes calculating, according to a second calculation, second precoder quality estimates for respective precoders in the second set of precoders, wherein the second precoder quality estimates are refined as compared to corresponding ones of the first precoder quality estimates, and wherein the second calculation is more complex than the first calculation. Still further, the method includes selecting one or more of the precoders from the second set of precoders as a preferred precoder or precoders, for use in precoding a transmission between the first and second nodes.

In another example, at least one node includes communication circuitry and processing circuitry configured to carry out certain operations. Here, the at least one node is at least one of a first node and a second node that are configured for wirelessly communicating with each other. The communication circuitry is configured for wireless communication, and the processing circuitry is operatively associated with the communication circuitry and configured to calculate, according to a first calculation, first precoder quality estimates for respective precoders in a first set of precoders. Further, the processing circuitry is configured to select a smaller, second set of precoders from the first set of precoders, at least in part as a function of the first precoder quality estimates, and calculate, according to a second calculation, second precoder quality estimates for respective precoders in the second set of precoders. The second precoder quality estimates are refined as compared to corresponding ones of the first precoder quality estimates, and the second calculation is more complex than the first calculation. Still further, the processing circuitry is configured to select one or more of the precoders from the second set of precoders as a preferred precoder or precoders, for use in precoding a transmission between the first and second nodes.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1 is a block diagram of one embodiment of a node, which comprises at least one of a first node and a second node that are configured for wireless communication with each other.

FIG. 2 is a logic flow diagram of one embodiment of a method of precoder selection.

DETAILED DESCRIPTION

Figure 3:
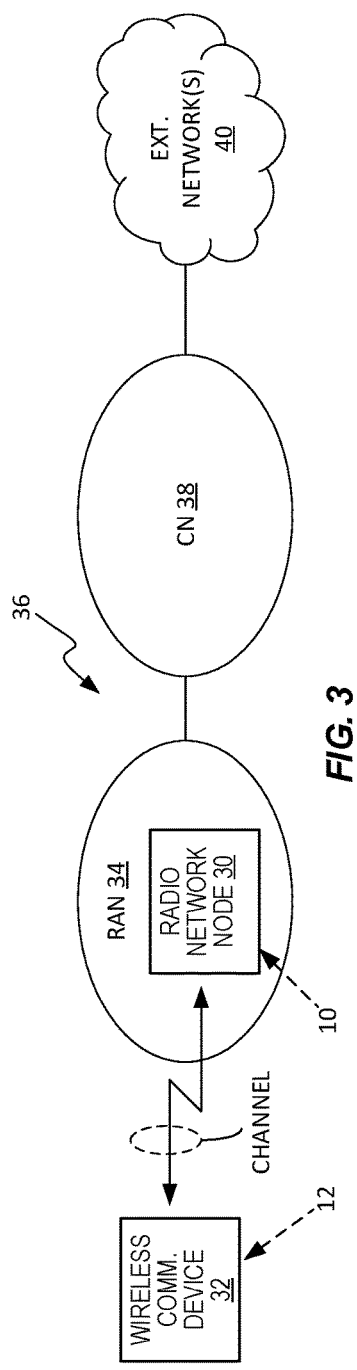
FIG. 3 is a block diagram of one embodiment of a wireless communication network.

FIG. 1 illustrates at least one node 8, comprised of at least one of a first network node 10 and a second network node 12. That is, the communication circuitry 14 and processing circuitry 16 included in the at least one node 8 may reside in the first network node 10, or in the second network node 12, or may be distributed between them. Further functional distributions are contemplated, such as where at least some of the involved functionality is implemented in remote processing resources not shown explicitly in FIG. 1, e.g., to one or more computer systems implemented within a larger network or in a data center.

In context, at least one of the first node 10 and the second node 12 is configured for precoding transmissions to the other node, e.g., based on selecting a precoder from a defined codebook. In this context, the communication circuitry 14 is configured for wireless communication, and the processing circuitry 16 is operatively associated with the communication circuitry 14 and configured to calculate, according to a first calculation, first precoder quality estimates for respective precoders in a first set of precoders. The processing circuitry 16 is further configured to select a smaller, second set of precoders from the first set of precoders, at least in part as a function of the first precoder quality estimates, and calculate, according to a second calculation, second precoder quality estimates for respective precoders in the second set of precoders. The second precoder quality estimates are refined as compared to corresponding ones of the first precoder quality estimates, and the second calculation is more complex than the first calculation. Still further, the processing circuitry 16 is configured to select one or more of the precoders from the second set of precoders as a preferred precoder or precoders, for use in precoding a transmission between the first and second nodes 10 and 12.

The processing circuitry 16 includes processing circuitry 20 at the first node 10, for example, where the processing circuitry 20 is configured to calculate the first precoder quality estimates, select the second set of precoders, and send an indication of the second set of precoders to the second node 12. The processing circuitry 16 may further include processing circuitry 24 at the second node 12 that is configured to receive the indication of the second set of precoders and, in response, calculate the second precoder quality estimates and select the preferred precoder or precoders.

In at least one such embodiment, the processing circuitry 24 at the second node 12 is configured to send an indication of the preferred precoder or precoders to the first node 10, for use by the processing circuitry 20 in the first node in precoding a transmission from the first node 10 for the second node 12. Further, in one or more such embodiments, the processing circuitry 20 at the first node 10 is configured to receive channel state information from the second node 12, or to determine the channel state information from a reference signal received at the first node 10 from the second node 12, and is further configured to calculate the first precoder quality estimates in dependence on the channel state information. Here, the channel state information or CSI will be understood as characterizing a propagation channel between the first and second nodes 10, 12.

FIG. 2 illustrates an example method 200 performed by the node 8, i.e., performed by at least one of the first node 10 and the second node 12. The method 200 includes calculating (Block 202), according to a first calculation, first precoder quality estimates for respective precoders in a first set of precoders, selecting (Block 204) a smaller, second set of precoders from the first set of precoders, at least in part as a function of the first precoder quality estimates, and calculating (Block 206), according to a second calculation, second precoder quality estimates for respective precoders in the second set of precoders. The method 200 further includes selecting (Block 208) one or more of the precoders from the second set of precoders as a preferred precoder or precoders, for use in precoding a transmission between the first and second nodes 10, 12.

An aspect of such processing is that the second precoder quality estimates are refined as compared to corresponding ones of the first precoder quality estimates, and the second calculation is more complex than the first calculation. In one example of being "more complex", the second calculation requires more computations than the first calculation. Here, the terms "first calculation" and "second calculation" may be understood as denoting more than one computation, e.g., a set or series of calculations done on per precoder basis, with the second calculation being more sophisticated or otherwise more computationally involved than the first calculation. In this sense, the first calculation may be understood as a preliminary or "first-pass" evaluation used to cull the first set of precoders, and the second calculation may be understood as a further or "second-pass" evaluation used to identify a preferred precoder or precoders from among the second set of precoders. Consequently, the further evaluation operates in reduced search space with fewer precoders to consider—as compared to the preliminary evaluation.

With reference to FIG. 3, the first node 10 comprises, for example, a radio network node 30 in a Radio Access Network, RAN, 34 of a wireless communication network 36, and the second node 12 comprises, for example, a wireless communication device 32 configured for operation in the wireless communication network 36. Thus, it will be appreciated that the node 8 depicted in FIG. 1 may be the radio network node 30, or the wireless communication device 32, or may comprise both the radio network node 30 and the wireless communication device 32.

The RAN 34 along with a Core Network, CN, 38 form the wireless communication network, which provides communication services to the wireless communication device 32, e.g., by operatively connecting it to one or more external networks 40, such as the Internet. In a non-limiting example, the network 36 comprises Wide Area Access Network or WAN, e.g., a cellular network based on 3GPP specifications. Example implementations include LTE-based implementations, as well as 5G implementations involving the New Radio, NR, interface.

Figure 4:
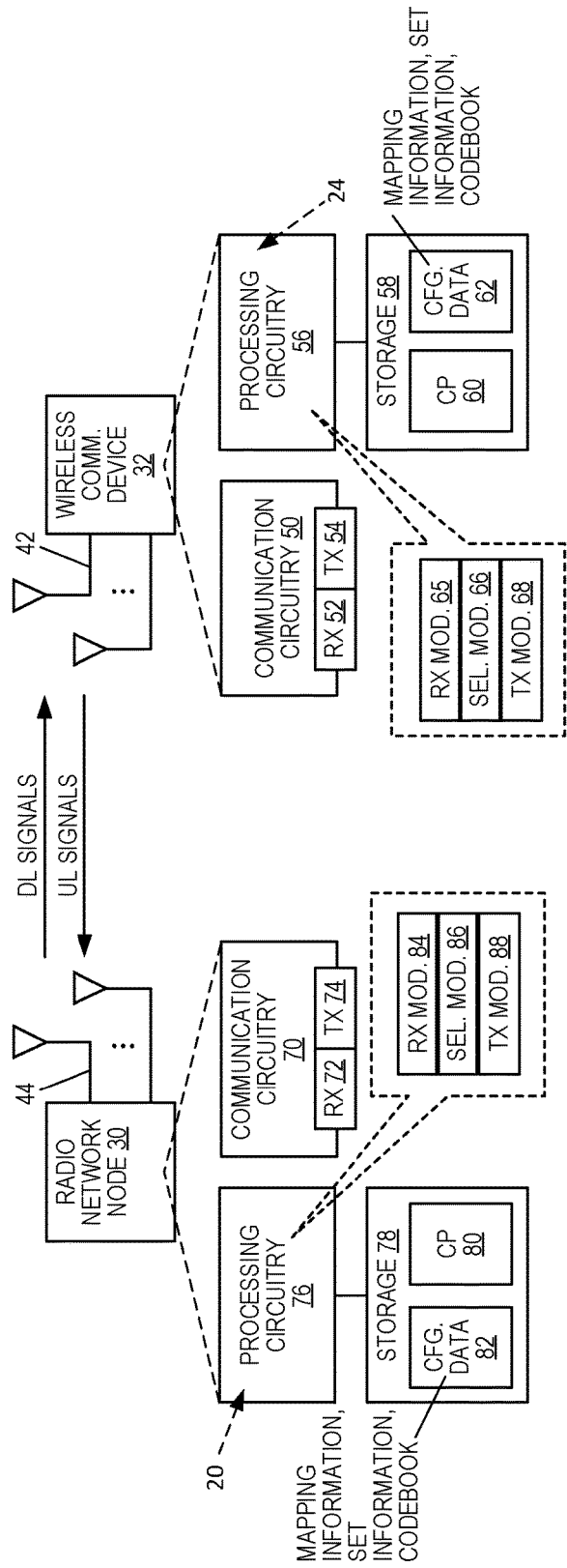
FIG. 4 is a block diagram of example embodiments of a radio network node and a wireless communication device.

FIG. 4 illustrates further example details for the wireless communication device 32 and the radio network node 30. The wireless communication device 32 includes one or more antennas 42 and the radio network node 30 includes a potentially large number of antennas 44, for receiving and/or transmitting. Here, the term "antenna" will be understood as encompassing "antenna elements," such as where the radio network node 30 includes one or more arrays of antenna elements, e.g., for beamforming.

According to further example details, the wireless communication device 32 includes communication circuitry 50 that provides physical-layer connectivity for transmitting and receiving communication signals from the antenna(s) 42. As an example, the communication circuitry 50 includes receiver circuitry 52 and transmitter circuitry 54 configured for cellular or other radio communications, in accordance with the air interface standards and associated signaling protocols used by the network 36. The communication circuitry 50 may include further circuits, e.g., supporting BLUETOOTH, WIFI, or other local connectivity.

Further componentry includes processing circuitry 56, which, in at least some embodiments, includes or is associated with storage 58. The processing circuitry 56 comprises fixed circuitry, programmed circuitry, or a mix of fixed and programmed circuitry. Functionally, the processing circuitry 56 may perform at least some baseband processing associated with transmitting and receiving signals via the communication circuitry 50. The processing circuitry 56 may also be configured to provide overall communication and control processing, etc.

The processing circuitry 56 comprises, for example, one or more microprocessors, digital signal processors, application specific integrated circuits, field programmable gate arrays, or other digital processing circuits. In at least one embodiment, the processing circuitry 56 comprises at least one processor and a memory storing a computer program comprising program instructions for execution by the at least one processor, whereby the at least one processor is configured to cause the wireless communication device 32 to operate as described herein.

Thus, the storage 58 may comprise one or more types of computer-readable memory providing non-transitory storage for a computer program 60 (abbreviated as "CP" in the diagram), for execution by a processor of the wireless communication device 32. The storage 58 may store other information, such as one or more items of configuration data 62 (abbreviated in "CFG. DATA" in the diagram). The configuration data 62 may include a defined codebook or information allowing the wireless communication device 32 to determine the precoders included in a defined codebook. Notably, "non-transitory" does not necessarily mean permanent or unchanging storage, but does connote storage of at least some persistence. In this regard, the storage 58 may include program memory or storage and working memory or storage, with the former being non-volatile and the latter being volatile. Non-limiting examples include any one or more of FLASH, EEPROM, SRAM, and DRAM circuitry and/or electromagnetic or solid-state disk storage.

Similar details apply to the radio network node 30, although it may have considerably more complexity and operate at higher power as compared to the wireless communication device 32, and it may include various computer or network interfaces not seen in the wireless communication device 32, for interfacing with other nodes or systems in the network 36. Broadly, however, the radio network node 30 includes communication circuitry 70, which provides physical-layer connectivity for transmitting and receiving communication signals from the antennas 44. As an example, the communication circuitry 70 includes receiver circuitry 72 and transmitter circuitry 74 configured for cellular or other radio communications, in accordance with the air interface standards and associated signaling protocols used by the network 36. Such circuitry may be implemented in resource pools or other plural configurations for use in supporting connections and associated processing for relatively large numbers of wireless communication devices.

Further componentry includes processing circuitry 76, which, in at least some embodiments, includes or is associated with storage 78. The processing circuitry 76 comprises fixed circuitry, programmed circuitry, or a mix of fixed and programmed circuitry. Functionally, the processing circuitry 76 may perform at least some baseband processing associated with transmitting and receiving signals via the communication circuitry 70. The processing circuitry 76 may also be configured to provide overall communication and control processing, etc.

The processing circuitry 76 comprises, for example, one or more microprocessors, digital signal processors, application specific integrated circuits, field programmable gate arrays, or other digital processing circuits. In at least one embodiment, the processing circuitry 76 comprises at least one processor and a memory storing a computer program comprising program instructions for execution by the at least one processor, whereby the at least one processor is configured to cause the radio network node 30 to operate as described herein.

Thus, the storage 78 comprises one or more types of computer-readable memory providing non-transitory storage for a computer program 80 (abbreviated in "CP"), for execution by a processor of the radio network node 30. The storage 78 may store other information, such as one or more items of configuration data 82 (abbreviated as "CFG. DATA"). Notably, "non-transitory" does not necessarily mean permanent or unchanging, but does connote storage of at least some persistence. In this regard, the storage 78 may include program memory or storage and working memory or storage, with the former being non-volatile and the latter being volatile. Non-limiting examples include any one or more of FLASH, EEPROM, SRAM, and DRAM circuitry and/or electromagnetic or solid-state disk storage.

In the above description, and elsewhere in the specification, references to items, entities, or components in the singular do not exclude the possibility of plural implementations, unless noted. For example, references to "a processor" are not limited to single-processor implementations and broadly encompass implementations using plural processors operating cooperatively for various ones of the involved functions. Similarly, references to "a node", such as "the radio network node 30", do not exclude multi-node or distributed implementations.

In an example implementation, the processing circuitry 56 of the wireless communication device 32 functionally implements a number of processing modules or circuits, such as a receiving module 65 that is configured to receive an indication from the radio network node 30 of a selected second set of precoders, as selected from a larger first set of precoders, a selecting module 66 that is configured to select one or more preferred precoders from the second set of precoders, and a transmitting module 68 that is configured to transmit an indication of the preferred precoder or precoders to the radio network node 30.

In complementary fashion, the processing circuitry 76 of the radio network node 30 implements a receiving module 84 that is configured to receive a channel-characterizing signal from the wireless communication device 32, a selecting module 86 that is configured to select the second set of precoders from the larger first set of precoders, e.g., based on channel state information gleaned from the channel-characterizing signal, and a transmitting module 88 that is configured to transmit an indication of the second set of precoders to the wireless communication device 32.

With the above example details in mind, it will be appreciated that in embodiments where the node 8 is comprised of at least the node 12, and where the node 12 is implemented as the wireless communication device 32 seen in FIGS. 3 and 4, the processing circuitry 16 of the node 8 will be understood as comprising or including the processing circuitry 56 of the wireless communication device 32. In at least one such embodiment, the processing circuitry 56 of the wireless communication device 32 is configured to: estimate channel conditions for a propagation channel between the wireless communication device 32 and the radio network node 30; calculate the first precoder quality estimates in dependence on the estimated channel conditions; calculate the second precoder quality estimates in dependence on the estimated channel conditions; and send an indication of the preferred precoder or precoders to the radio network node 30.

The first set of precoders comprises, for example, a full set of precoders in a defined codebook known to the first and second nodes 10 and 20. The first set of precoders may include one or more precoders for each of two or more transmission ranks, and the processing circuitry 16 of the at least one node 8 may be configured to select the second set of precoders from the first set of precoders by selecting at least one precoder from each of at least two of the two or more transmission ranks, such that the precoders in the second set of precoders cover at least two transmission ranks.

In at least one example implementation, the processing circuitry 16 of the at least one node 8 is configured to calculate the first precoder quality estimates by calculating, according to the first calculation, a first beamforming gain corresponding to each precoder in the first set of precoders. Correspondingly, the processing circuitry 16 is configured to rank the precoders in the first set of precoders according to the corresponding first beamforming gains, and select the precoders to be included in the second set of precoders based on the ranking.

The processing circuitry 16 may be further configured to calculate the second precoder quality estimates by calculating, according to the second calculation, a second beamforming gain corresponding to each precoder in the second set of precoders. Here, the second calculation yields a more accurate estimation of beamforming gain as compared to the first calculation, and the processing circuitry 16 is configured to rank the precoders in the second set of precoders according to the corresponding second beamforming gains and select the preferred precoder or precoders based on the ranking.

In at least one embodiment, the first set of precoders comprises a codebook of precoders comprising two or more column vectors, and the first calculation is a correlation between an L-sized set of precoder column vectors and the L strongest singular vectors obtained by performing a singular value decomposition of a channel matrix comprising an estimate of a propagation channel between the first and second nodes. The second set of precoders comprises selected ones of the precoders in the first set, or selected subsets of elements from the column vectors of one or more precoders in the first set. In instances where a precoder in the second set is a subset of the vector elements comprising a precoder in the first set, the precoder in the second set may be scaled in amplitude.

Referring momentarily back to FIG. 2, it will be appreciated that the method 200 may be performed by the first node 10, or by the second node 12, or by both nodes 10 and 12 in a cooperative fashion. Such an understanding, therefore, extends to FIG. 3, where the node 10 is implemented as a radio network node 30 and the second node 12 is implemented as a wireless communication device 32. By way of example, radio network node 30 is a base station, wireless access point, relay node, or other apparatus configured for providing radio connectivity to the network 36. In further examples, the wireless communication device 32 is a 3GPP device, referred to as a User Equipment or UE. More generally, the wireless communication device 32 is essentially any wireless apparatus configured for operation in the network 36. Non-limiting examples include a mobile terminal, a Wireless Transmit and Receive Unit or WTRU, a laptop computer, a tablet, a smartphone or feature phone, a network adaptor or dongle, or a Machine Type Communication, MTC, device.

In an example configuration, the processing circuitry 56 of the wireless communication device 32 is configured to perform the method 200 or variations and extensions thereof. In another embodiment, the processing circuitry 76 of the radio network node 30 is configured to perform the method 200 or variations and extensions thereof. In yet another embodiment, the processing circuitry 56 of the wireless communication device 32 is configured to perform certain steps of the method 200, while the processing circuitry 76 of the radio network node 30 is configured to perform the remaining steps of the method 200.

In one such example, the wireless communication device 12 transmits a channel-characterizing signal, and the radio network node 30 selects a smaller second set of precoders from a larger first set of precoders, based on channel state information determined from the channel-characterizing signal. The radio network node 30 indicates the second set of precoders to the wireless communication device 32 and the wireless communication device 32 evaluates precoders in the second set using an evaluation that is more computationally complex than the one used to cull the second set of precoders from the first set. Further, the wireless communication device 32 selects one or more preferred precoders from the second set, based on the results of its evaluation of precoders in the second set, and performs at least one of: indicating the preferred precoder or precoders to the radio network node 30 for use by the radio network node 30 for downlink transmission to the wireless communication device 32, and using the preferred precoder or precoders for uplink transmission to the radio network node 30.

Figure 5:
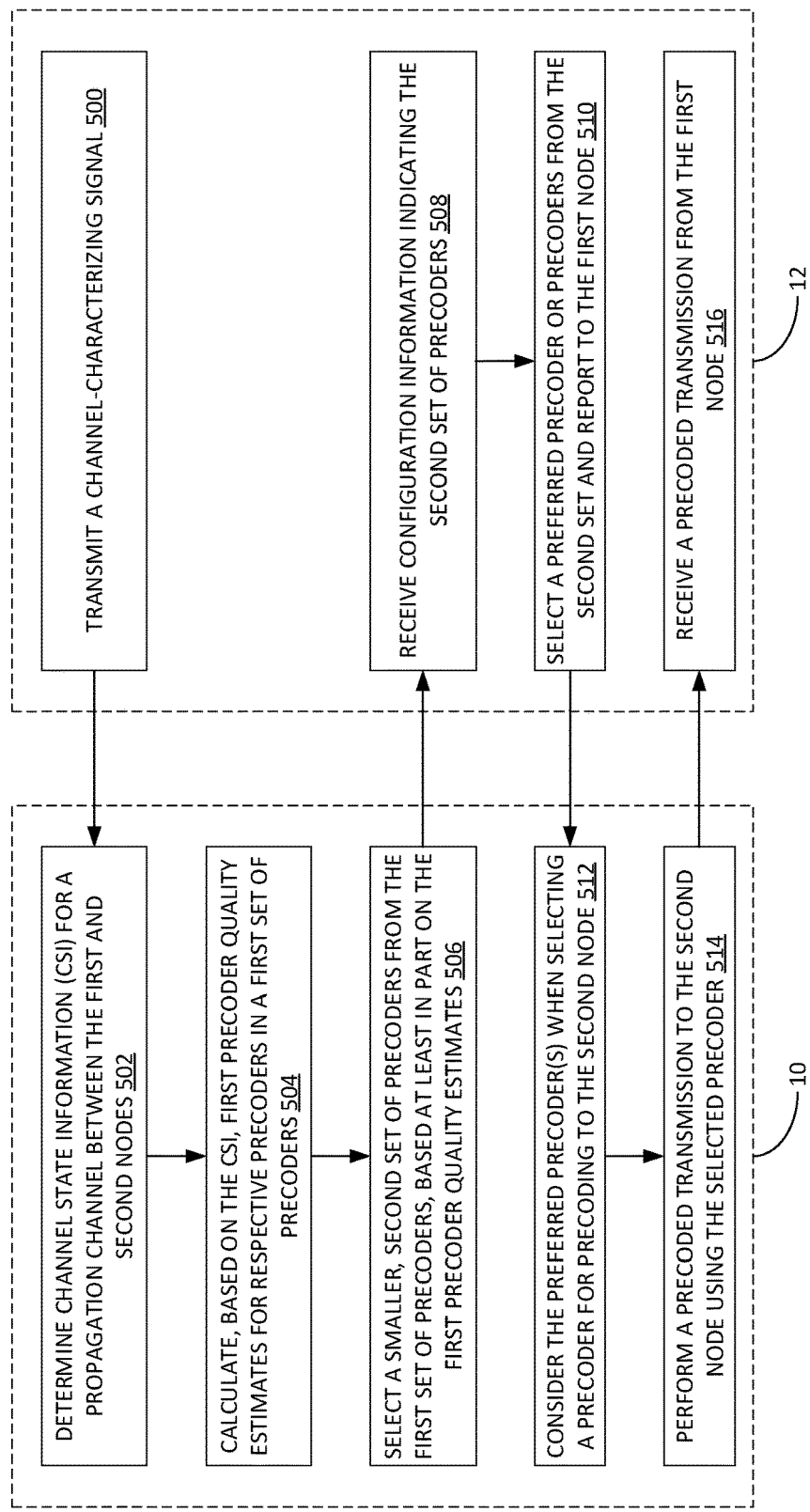
FIG. 5 is a logic flow diagram of one embodiment of a method cooperatively performed by first and second nodes.

FIG. 5 depicts a method that may be understood as one possible implementation of the method 200 and it is characterized by its distributed nature—i.e., portions of the overall method are performed in respective ones of first and second nodes 10 and 12. According to the example flow, the second node 12 transmits a channel-characterizing signal to a first node 10 (Step 500). The channel-characterizing signal is a reference-signal transmission in one embodiment, which can be used by the first node 10 for estimating the channel. In another embodiment, the channel-characterizing signal is a CSI report or other transmission that conveys information about the channel, as determined by the second node 12, e.g., based on reference signals received at the second node 12 from the first node 10.

In any case, the method continues (Step 502) with the first node 10 determining CSI for a propagation channel between the first and second nodes 10 and 12, e.g., based on the received channel-characterizing signal. Further, at Step 504, the first node 10 determines first precoder quality estimates for respective precoders in a first set of precoders. These first precoder quality estimates may be computed as a function of the CSI, and the method continues (Step 506) with the first node 10 using the first precoder quality estimates to select a smaller second set of precoders from the first set, based at least in part on the first precoder quality estimates. For example, the first node 10 may select the precoders corresponding to the "N" highest ones of the first quality estimates, but may supplement or replace members of that set to ensure that all transmission ranks are represented.

The first node 10 indicates the second set of precoders to the second node 12, e.g., the second node 12 receives (Step 508) configuration information from the first node 10, which indicates the second set of precoders. The method continues with the second node 12 selecting a preferred precoder or precoders from the second set of precoders and reporting the preferred precoder(s) to the first node 10 (Step 510). Correspondingly, the first node 10 considers the preferred precoder(s), as reported by the second node 12, when selecting a precoder for precoding to the second node 12 (Step 512). That is, the first node 10 may adopt the preferred precoder unless it decides that a different precoder is more appropriate, in view of an overall set of considerations in play at the first node 10, e.g., multi-user scheduling etc. Regardless, the method continues with the first node 10 performing a precoded transmission to the second node 12 using the selected precoder (Step 514), and the second node 12 receiving the precoded transmission from the first node 10 (Step 516).

As a general aspect of operation in one or more embodiments, the wireless communication device 32 obtains a set of precoders $S_1$, e.g., via a defined codebook, and estimates one or more channel characteristic properties based on measured downlink reference signals from the radio network node 30. The channel estimate can be written in matrix form as $H \in \mathbb{C}^2$ and a precoder as $P \in S_1$. Operations at the wireless communication device 32 rely on first and a second quality estimation mappings, denoted as $q_1 : S_1 \to \mathbb{R}$ and $q_2 : S_2 \to \mathbb{R}$, where $S_2$ is a strict subset of $S_1$ and where higher values of $q_1$ and $q_2$ represent higher quality for the given precoder P being evaluated.

Both mappings $q_1$ and $q_2$ include coefficients of the channel matrix H as parameters and can be defined outside the corresponding domains $S_1$ and $S_2$. In an example, the first mapping is a simple function to evaluate, computationally, and yields typically a crude estimate of the information that can be conveyed over the channel H using the precoder P. The second mapping is a more advanced function to evaluate and typically yields a more accurate estimate of the information that can be conveyed over H using P. The results from the second mapping are included in the CSI-report back to the network 36, i.e., $q_2$ can correspond to the q function given in the problem formulation. Thus, an advantageous aspect of such operation is to decide upon a strictly smaller set $S_2$ of precoders from $S_1$ using the mapping $q_1$ and then use $q_2$ over the smaller set $S_2$ to compute the quality of the precoders to be included in the CSI-report.

In one embodiment, the mapping $q_1$ is a linear combination of $H \in \mathbb{C}^2$ and $P \in S_1$, $A + B^*(H^*P)$ followed by a norm operator, $\|A + B^*(H^*P)\|$, where A and B are scaling matrices and the norm operator $\|.\|$ can be the Frobenius norm or some other mathematical distance measure.

In another embodiment, the mapping $q_1$ is a table over the set $S_1$, with each entry corresponding to a precoder P and whose entries depend on the realization of H via some transformation. One example is a linear transformation $D^*H$ with the DFT matrix D, which produces entries in the table that correspond to the strength of the spatial angles of H.

In another embodiment, the procedure can be extended in order to construct a series of quality estimators $q_1$, $q_2, \ldots, q_N$ that operate on a series of sets of precoders $S_1$, $S_2, \ldots, S_N$ to construct a series of smaller sets of precoders $S_2, S_3, \ldots, S_{N+1}$. The CSI-report from the wireless communication device 32 to the radio network node 30 includes an indication of the set $S_{N+1}$ along with the corresponding quality estimates from the last quality estimator $q_N$. In some embodiments, the choice of precoder/s to be included in the report is/are based on the highest values calculated with $q_N$.

Another embodiment includes performing the following steps:

(1) The channel $H \in \mathbb{C}^2$ (k×n matrix) is decomposed using a singular value decomposition H=USV, where the matrix v comprises the non-zero singular values $s_1, s_2, \ldots, s_k$ and the matrix $V=(v_1, v_2, \ldots, v_k)$, where V is a n×n matrix, comprising the (right) singular (column) vectors.

(2) For each precoder $P=(p_1, p_2, \ldots, p_L)$ with column vectors $p_1, p_2, \ldots, p_L$, let $$q_1(P) \stackrel{def}{=} |p_1^* v_1|.$$

That is, $q_1$ defines a correlation value between the first column of the precoder and the strongest singular vector.

(3) Determine $S_1$ as the set of precoders such as the correlation value exceeds a certain threshold.

In some examples of the above embodiment, $q_2$ corresponds to the q function. In other examples of the above embodiment $q_2$ is defined to be the sum of correlations of the first two columns of P and the first two singular vectors $v_1$, $v_2$, and $S_3$ is obtained as the set of precoders where the correlation-sum exceeds some threshold, and so on for a number of steps L. For step L, $q_{L+1}$ corresponds to the function q and $S_{L+1}$ to the set or precoders indicated in the CSI-report. In some such embodiments, the sum is weighted and the weights are equal to the singular values. In other similar embodiments, the function $q_1$ is a weighted correlation sum of m columns of P and the m strongest singular vectors.

$S_1$ typically includes precoders with different ranks. In configurations or instances where the wireless communication device 32 determines which rank to recommend to the radio network node 30, reception interference at the wireless communication device 32 becomes an important factor to consider. In at least some embodiments, the first mapping yields a crude estimate of the information that can be conveyed over H using P, without consideration of the effects of interference. In another embodiment, at least one precoder per every possible rank option is included in the smaller set $S_2$. Doing so ensures that precoders for all rank options are available in the second mapping, which is a more advanced function than the first mapping and which may account for interference.

According to one or more aspects of the above-described operations, a wireless communication device 32 needs only to evaluate a fraction of an overall codebook when performing CSI evaluation, which may increase CSI accuracy and reduce CSI latency. Further, by reducing the number of precoders that must be evaluated in detail by the wireless communication device 32, less capable or lower power processing hardware becomes viable, and commensurate gains in battery life may be obtained. Additionally, or alternatively, computing resources that would otherwise be allocated to evaluating large sets of precoders in detail can be put to advantageous use in other processing tasks.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by at least one of a first node and a second node that are configured for wirelessly communicating with each other, the method comprising:

calculating, according to a first calculation, first precoder quality estimates for respective precoders in a first set of precoders;

selecting a smaller, second set of precoders from the first set of precoders, at least in part as a function of the first precoder quality estimates;

calculating, according to a second calculation, second precoder quality estimates for respective precoders in the second set of precoders, wherein the second precoder quality estimates are refined as compared to corresponding ones of the first precoder quality estimates, and wherein the second calculation is more complex than the first calculation; and selecting one or more of the precoders from the second set of precoders as a preferred precoder or precoders, for use in precoding a transmission between the first and second nodes;

wherein the first node calculates the first precoder quality estimates, selects the second set of precoders, sends an indication of the second set of precoders to the second node, and wherein the second node calculates the second precoder quality estimates and selects the preferred precoder or precoders.

2. The method of claim 1, further comprising the second node sending an indication of the preferred precoder or precoders to the first node, for use by the first node in precoding a transmission from the first node for the second node.

3. The method of claim 1, further comprising the first node receiving channel state information from the second node, or determining the channel state information from a reference signal received at the first node from the second node, and wherein the first node calculates the first precoder quality estimates in dependence on the channel state information, said channel state information characterizing a propagation channel between the first and second nodes.

4. The method of claim 1, wherein the first node comprises a radio network node in a Radio Access Network (RAN) of a wireless communication network, and wherein the second node comprises a wireless communication device configured for operation in the wireless communication network.

5. The method of claim 4, wherein the wireless communication device performs the method, and wherein the method further comprises the wireless communication device:
estimating channel conditions for a propagation channel between the wireless communication device and the radio network node;
calculating the first precoder quality estimates in dependence on the estimated channel conditions;
calculating the second precoder quality estimates in dependence on the estimated channel conditions; and
sending an indication of the preferred precoder or precoders to the radio network node.

6. The method of claim 1, wherein the first set of precoders comprises a full set of precoders in a defined codebook known to the first and second nodes.

7. The method of claim 1, wherein calculating the first precoder quality estimates comprises calculating, according to the first calculation, a first beamforming gain corresponding to each precoder in the first set of precoders, and wherein selecting the second set of precoders comprises ranking the precoders in the first set of precoders according to the corresponding first beamforming gains, and selecting the precoders to be included in the second set of precoders based on the ranking.

8. The method of claim 7, wherein calculating the second precoder quality estimates comprises calculating, according to the second calculation, a second beamforming gain corresponding to each precoder in the second set of precoders, the second calculation yielding a more accurate estimation of beamforming gain as compared to the first calculation, and wherein selecting one or more of the precoders from the second set of precoders as the preferred precoder or precoders comprises ranking the precoders in the second set of precoders according to the corresponding second beamforming gains, and selecting the preferred precoder or precoders based on the ranking.

9. The method of claim 1, wherein the first set of precoders comprises a codebook of precoders comprising two or more column vectors, and wherein the first calculation is a correlation between an L-sized set of precoder column vectors and the L strongest singular vectors obtained by performing a singular value decomposition of a channel matrix comprising an estimate of a propagation channel between the first and second nodes, and wherein the second set of precoders comprises selected ones of the precoders in the first set, or selected subsets of elements from the column vectors of one or more precoders in the first set.

10. At least one node, including at least one of a first node and a second node that are configured for wirelessly communicating with each other, the at least one node comprising:
communication circuitry configured for wireless communication; and
processing circuitry operatively associated with the communication circuitry and configured to:
calculate, according to a first calculation, first precoder quality estimates for respective precoders in a first set of precoders;
select a smaller, second set of precoders from the first set of precoders, at least in part as a function of the first precoder quality estimates;
calculate, according to a second calculation, second precoder quality estimates for respective precoders in the second set of precoders, wherein the second precoder quality estimates are refined as compared to corresponding ones of the first precoder quality estimates, and wherein the second calculation is more complex than the first calculation; and
select one or more of the precoders from the second set of precoders as a preferred precoder or precoders, for use in precoding a transmission between the first and second nodes;
wherein the processing circuitry includes processing circuitry at the first node that is configured to calculate the first precoder quality estimates, select the second set of precoders, and send an indication of the second set of precoders to the second node, and wherein the processing circuitry includes processing circuitry at the second node that is configured to receive the indication of the second set of precoders and, in response, calculate the second precoder quality estimates and select the preferred precoder or precoders.

11. The at least one node of claim 10, wherein the processing circuitry at the second node is configured to send an indication of the preferred precoder or precoders to the first node, for use by the processing circuitry in the first node in precoding a transmission from the first node for the second node.

12. The at least one node of claim 10, wherein the processing circuitry includes processing circuitry at the first node that is configured to receive channel state information from the second node, or to determine the channel state information from a reference signal received at the first node from the second node, and is further configured to calculate the first precoder quality estimates in dependence on the channel state information, said channel state information characterizing a propagation channel between the first and second nodes.

13. The at least one node of claim 10, wherein the first node comprises a radio network node in a Radio Access Network (RAN) of a wireless communication network, and wherein the second node comprises a wireless communication device configured for operation in the wireless communication network.

14. The at least one node of claim 13, wherein the processing circuitry comprises processing circuitry at the wireless communication device, and wherein the processing circuitry at the wireless communication device is further configured to:
estimate channel conditions for a propagation channel between the wireless communication device and the radio network node;
calculate the first precoder quality estimates in dependence on the estimated channel conditions;
calculate the second precoder quality estimates in dependence on the estimated channel conditions; and
send an indication of the preferred precoder or precoders to the radio network node.

15. The at least one node of claim 10, wherein the first set of precoders comprises a full set of precoders in a defined codebook known to the first and second nodes.

16. The at least one node of claim 10, wherein the processing circuitry is configured to calculate the first precoder quality estimates by calculating, according to the first calculation, a first beamforming gain corresponding to each precoder in the first set of precoders, and is configured to rank the precoders in the first set of precoders according to the corresponding first beamforming gains, and is configured to select the precoders to be included in the second set of precoders based on the ranking.

17. The at least one node of claim 16, wherein the processing circuitry is configured to calculate the second precoder quality estimates by calculating, according to the second calculation, a second beamforming gain corresponding to each precoder in the second set of precoders, wherein the second calculation yields a more accurate estimation of beamforming gain as compared to the first calculation, and wherein the processing circuitry is configured to rank the precoders in the second set of precoders according to the corresponding second beamforming gains, and is configured to select the preferred precoder or precoders based on the ranking.

18. The at least one node of claim 10, wherein the first set of precoders comprises a codebook of precoders comprising two or more column vectors, and wherein the first calculation is a correlation between an L-sized set of precoder column vectors and the L strongest singular vectors obtained by performing a singular value decomposition of a channel matrix comprising an estimate of a propagation channel between the first and second nodes, and wherein the second set of precoders comprises selected ones of the precoders in the first set, or selected subsets of elements from the column vectors of one or more precoders in the first set.

19. A method performed by at least one of a first node and a second node that are configured for wirelessly communicating with each other, the method comprising:
    calculating, according to a first calculation, first precoder quality estimates for respective precoders in a first set of precoders;
    selecting a smaller, second set of precoders from the first set of precoders, at least in part as a function of the first precoder quality estimates;
    calculating, according to a second calculation, second precoder quality estimates for respective precoders in the second set of precoders, wherein the second precoder quality estimates are refined as compared to corresponding ones of the first precoder quality estimates, and wherein the second calculation is more complex than the first calculation; and
    selecting one or more of the precoders from the second set of precoders as a preferred precoder or precoders, for use in precoding a transmission between the first and second nodes;
    wherein the first set of precoders includes one or more precoders for each of two or more transmission ranks, and wherein selecting the second set of precoders from the first set of precoders further comprises selecting at least one precoder from each of at least two of the two or more transmission ranks, such that the precoders in the second set of precoders cover at least two transmission ranks.

20. At least one node, including at least one of a first node and a second node that are configured for wirelessly communicating with each other, the at least one node comprising:
    communication circuitry configured for wireless communication; and
    processing circuitry operatively associated with the communication circuitry and configured to:
        calculate, according to a first calculation, first precoder quality estimates for respective precoders in a first set of precoders;
        select a smaller, second set of precoders from the first set of precoders, at least in part as a function of the first precoder quality estimates;
        calculate, according to a second calculation, second precoder quality estimates for respective precoders in the second set of precoders, wherein the second precoder quality estimates are refined as compared to corresponding ones of the first precoder quality estimates, and wherein the second calculation is more complex than the first calculation; and
        select one or more of the precoders from the second set of precoders as a preferred precoder or precoders, for use in precoding a transmission between the first and second nodes;
        wherein the first set of precoders includes one or more precoders for each of two or more transmission ranks, and wherein the processing circuitry is configured to select the second set of precoders from the first set of precoders by selecting at least one precoder from each of at least two of the two or more transmission ranks, such that the precoders in the second set of precoders cover at least two transmission ranks.

* * * * *